(12) United States Patent
Sareshwala et al.

(10) Patent No.: US 11,102,239 B1
(45) Date of Patent: Aug. 24, 2021

(54) CLIENT DEVICE IDENTIFICATION ON A NETWORK

(71) Applicant: Twitter, Inc., San Francisco, CA (US)

(72) Inventors: Faraaz Sareshwala, San Francisco, CA (US); Todd Segal, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 280 days.

(21) Appl. No.: 15/810,371

(22) Filed: Nov. 13, 2017

(51) Int. Cl.
*H04L 9/32* (2006.01)
*H04L 29/06* (2006.01)
*H04L 29/08* (2006.01)
*H04L 29/12* (2006.01)

(52) U.S. Cl.
CPC ........ *H04L 63/1458* (2013.01); *H04L 9/3236* (2013.01); *H04L 63/1416* (2013.01); *H04L 63/1425* (2013.01); *H04L 63/166* (2013.01); *H04L 9/3252* (2013.01); *H04L 61/1511* (2013.01); *H04L 67/02* (2013.01); *H04L 67/146* (2013.01); *H04L 69/16* (2013.01); *H04L 2463/141* (2013.01)

(58) Field of Classification Search
None
See application file for complete search history.

(56) References Cited

U.S. PATENT DOCUMENTS

| | | | |
|---|---|---|---|
| 6,374,359 | B1 | 4/2002 | Shrader et al. |
| 8,266,687 | B2 | 9/2012 | Baldry |
| 10,038,715 | B1* | 7/2018 | Majkowski ......... H04L 63/1466 |
| 2006/0250954 | A1* | 11/2006 | Mulrane, Jr. ........... H04L 41/00 370/229 |
| 2011/0055921 | A1* | 3/2011 | Narayanaswamy ......................... H04L 63/1458 726/22 |
| 2014/0150094 | A1* | 5/2014 | Rao ..................... H04L 63/1458 726/22 |
| 2014/0304817 | A1 | 10/2014 | Kim et al. |
| 2015/0269379 | A1* | 9/2015 | Ramzan .................. H04L 51/12 726/23 |

(Continued)

OTHER PUBLICATIONS

Eckersley, "How Unique is Your Web Browser?," Proceedings of the 10th International Conference on Privacy Enhancing Technologies: Lecture Notes in Computer Science, Jul. 21-23, 2010, 6205:1-18.

(Continued)

*Primary Examiner* — Fatoumata Traore
(74) *Attorney, Agent, or Firm* — Fish & Richardson P.C.

(57) ABSTRACT

Methods, systems, and apparatus, including computer programs encoded on computer storage media, for identifying devices. One of the methods includes receiving one or more data packets at a network location from a client device, the one or more data packets being associated with a connection request from the client device seeking a connection with particular network resources; identifying transport layer information from the one or more data packets; extracting particular values of the transport layer information; generating a cryptographic hash value from the extracted values, wherein the hash value provides an identifier for the client device; using the identifier for the client device to monitor subsequent connection requests from the client device; and in response to the monitoring, determining whether to perform denial of service (DoS) mitigation with respect to the client device.

23 Claims, 4 Drawing Sheets

(56) References Cited

U.S. PATENT DOCUMENTS

2016/0248790 A1* 8/2016 Chesla ................ H04L 63/1458
2016/0359823 A1* 12/2016 Ayyadevara .......... H04L 63/061
2017/0374098 A1* 12/2017 Kish ................... H04L 43/0876

OTHER PUBLICATIONS

Matsunaka et al., "Passive OS Fingerprinting by DNS Traffic Analysis," 27th International Conference on Advanced Information Networking and Applications, Mar. 25-28, 2013, 8 pages.
Taleck, "Ambiguity Resplution via Passive OS Fingerprinting," International Workshop on Recent Advances in Intrusion Detection: Lecture Notes in Computer Science, Sep. 2003. 2820:192-206.

\* cited by examiner

CLIENT DEVICE IDENTIFICATION ON A NETWORK

BACKGROUND

A typical denial-of-service (DoS) attack is a computer networking attack that seeks to make a network resource unavailable to user devices. For example, a DoS attack can use a client device as a source device that floods a web resource provider with connection requests. These requests can overload the provider such that legitimate requests to access the web resource from client devices are delayed or prevented. A distributed denial-of-service (DDoS) attack uses multiple source devices to originate the connection requests. One technique for mitigating the DoS attack is to identify the source device initiating the connection requests and to block connection requests from that source device.

SUMMARY

This specification describes techniques for uniquely identifying client devices passively regardless of particular technology enabled by the client devices to connect to a system. Consequently, the specification describes the generation of an identifier for a particular source device even when the source devices refuse cookies or other identifying data. In particular, this specification describes the use of transport layer information to transparently generate a unique identifier for a client device based on received information from the client device, for example, as part of a connection request received from the client device. The ability to identify client devices can help a system identify that a DoS or DDoS attack is occurring as well as take mitigation steps including mitigation directed at the specific client device such as rate limiting or refusing connection requests from that client device.

In general, one innovative aspect of the subject matter described in this specification can be embodied in methods that include the actions of receiving one or more data packets at a network location from a client device, the one or more data packets being associated with a connection request from the client device seeking a connection with particular network resources; identifying transport layer information from the one or more data packets; extracting particular values of the transport layer information; generating a cryptographic hash value from the extracted values, wherein the hash value provides an identifier for the client device; using the identifier for the client device to monitor subsequent connection requests from the client device; and in response to the monitoring, determining whether to perform denial of service (DoS) mitigation with respect to the client device. Other embodiments of this aspect include corresponding computer systems, apparatus, and computer programs recorded on one or more computer storage devices, each configured to perform the actions of the methods.

This specification uses the term "configured" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

The foregoing and other embodiments can each optionally include one or more of the following features, alone or in combination. In particular, one embodiment includes all the following features in combination. Using the identifier for the client device to monitor subsequent connection requests from the client device includes: receiving one or more data packets at the network location associated with a new connection request; extracting particular values from transport layer information; generating a new hash from the extracted values; and determining that the new hash value corresponds to the same client device based on a comparison between the new hash value and the hash value. The method further includes storing a number of connection requests from the client device; and determining whether a number of connection requests received from the client device over a specified time period exceed a threshold value.

In response to determining that the number of connection requests received from the client device over the specified time period exceed a threshold value: determining a total number of connection requests to the network resources being received; and based on the determination, initiating one or more DoS mitigation controls. Performing DoS mitigation includes initiating rate limiting. Performing DoS mitigation includes blocking requests from the client device. Generating the hash value includes concatenating the extracted values to form a single string and generating the hash value from the string. Transport layer information includes one or more transport control protocol (TCP) parameters having values specified by an operating system of the client device. The transport layer information includes one or more transport layer security (TLS) parameters having values specified by an operating system of the client device.

The subject matter described in this specification can be implemented in particular embodiments so as to realize one or more of the following advantages. An identifier can be generated for each client device connecting to a system. The identifiers can be reliably and repeatedly generated without sending data to be stored on the client device. Thus, the identifiers can be generated transparently to the corresponding client device in a passive manner. This contrasts with the problem of obtaining identifiers that rely on acceptance of user devices, e.g., cookies, that can be subverted by end users.

The identifiers generated for each client device allow for monitoring particular behaviors or for trends in behavior indicative of an attack including a DDoS attack. Mitigation steps can then be taken in response to the detected behaviors. Additionally, the identifiers allow for a more granular targeting of particular attacking accounts. For example, specific attacking devices can be blocked rather than broader blocking that impacts both attacking and legitimate devices. As a result, mitigation steps can reduce a likelihood of affecting legitimate traffic. Consequently, this specification describes techniques that make it possible to identify a network attack and take mitigation steps using passively generated identifiers that provide identification against attackers that take steps to subvert conventional techniques for identifying particular devices.

Additionally, the identifier can be generated without relying on particular technology to be enabled by the client device. For example, browser fingerprinting performed using JavaScript requires that a client device use a browser that enables JavaScript. By contrast, the generated identifier described in this specification works on the network layer so that it can be generated regardless of which technology the client device is using to connect.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Mitigating Layer 7 DoS attacks often depends on an ability to determine an identity of individual source devices. For example, if an abnormal amount of requests are received from the same device, indicative of participation in an attack, connections with that source device can be mitigated using various techniques. Determination of an abnormal amount can be based on a number or rate or requests relative to other source devices to identify outlier source devices. Additionally, the types of requests can also be abnormal. For example, a given source device repeatedly requesting the same resource, e.g., a particular web page, can be considered abnormal relative to the types of requests made by other source devices.

One way of uniquely identifying a source device is to use Hypertext Transfer Protocol (HTTP) cookies sent as part of HTTP requests from the source device to a system. HTTP requests are application layer requests used after establishing network connections, e.g., between client devices and servers. For example, to access a particular website, a web browser of a client device can send an HTTP request message to a web server hosting the website after establishing a connection to the web server.

Cookies are often used to determine if a request from a client device indicates a new client device or is a subsequent request made from a client device that has previously made a request. A response to a client HTTP request can include a request to set an HTTP cookie that identifies the client device. If accepted by the client device, each subsequent HTTP request from the client to the server will include the HTTP cookie. Consequently, subsequent requests from a client device can be identified as associated with the same client device based on the received cookie.

However, attackers can ignore received cookies, e.g., by refusing a Set-Cookie header sent to source devices in response to a HTTP connection requests. Therefore, the HTTP cookies are not stored on the source device. As a result, subsequent HTTP connection requests from the same source device, e.g., from source device, look like new devices to the server.

This specification describes techniques for uniquely identifying source devices passively even if the source devices refuse cookies or other identifying data. The ability to identify source devices can help a system identify that a DoS or DDoS attack is occurring as well as take mitigation steps. In particular, this specification describes the use of transport layer information to transparently generate a unique identifier for a source device based on received information from the source device.

Figure 1:
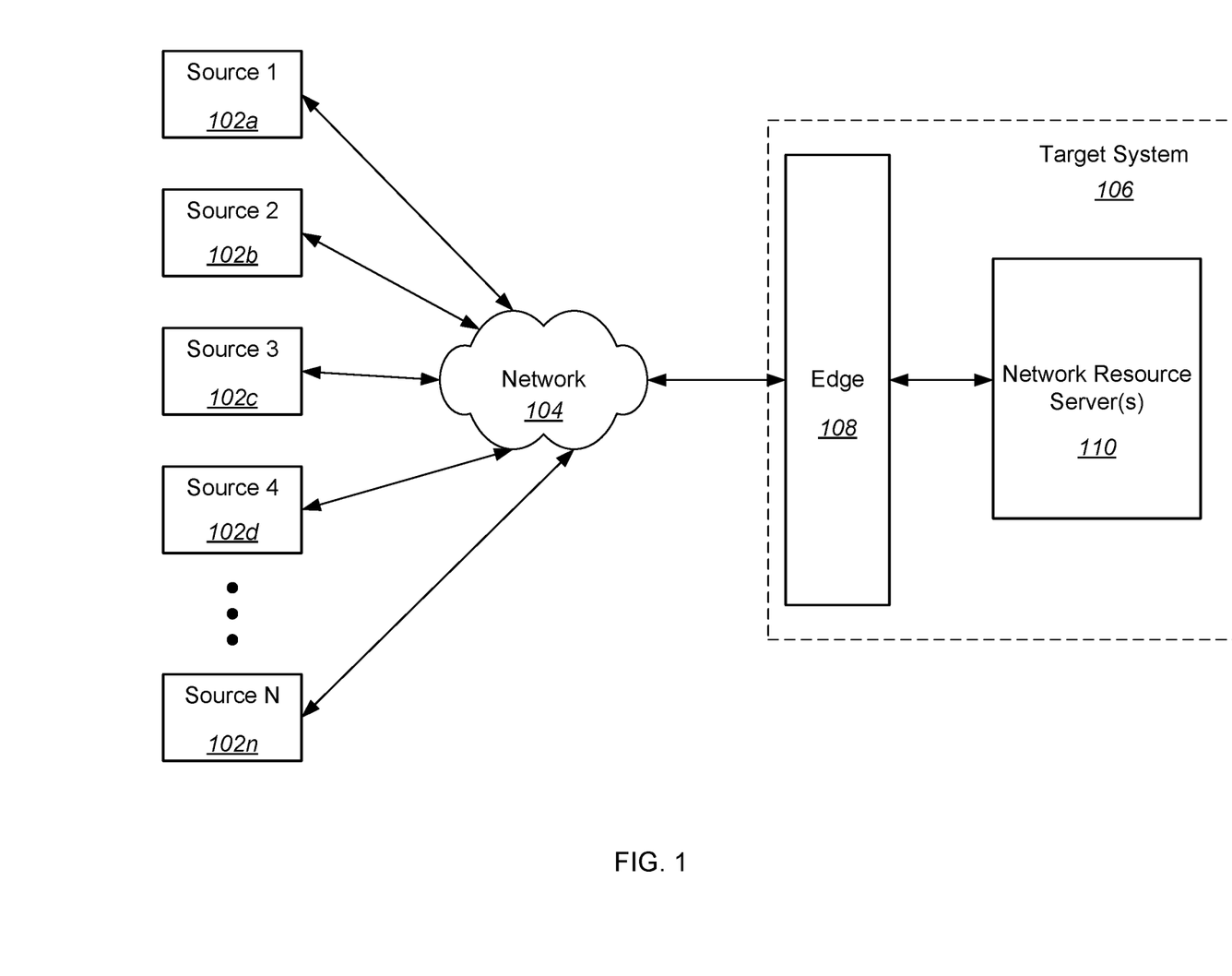
FIG. 1 is a diagram illustrating an example system that includes client devices that can be used to undertake a DDoS attack.

FIG. 1 is a diagram illustrating an example system 100 that includes client devices that can be used to undertake a DDoS attack. Because a DDoS attack uses multiple source devices to originate the connection requests, the DDoS attack cannot be stopped by blocking a single source device. For example, as shown in FIG. 1, source devices 102a-102n can be participating in the DDoS attack. Each of the source devices 102a-102n can submit repeated connection requests to target system 106 through network 104. The source devices 102a-102n can represent, for example, individual computers that have been compromised by malware. The malware allows the originator of an attack to coordinate requests from many computers and unknowingly to the legitimate users of those computers.

A request from a source device 102 reaches the target system 106 at an edge device 108. The edge device 108 provides the entry point to a system network. In the example shown in FIG. 1, the network of the target system 106 can include network resource server(s) 110 that can send and receive data, e.g., in response to HTTP requests. The target system 106 may have multiple edge devices 108. Edge devices can include routers and routing switches that function as an entry port to the network and that route received external data to designated destinations within the network of the target system.

In the example shown in FIG. 1, the edge device 108 is part of the target system 106. However, in some implementations, a separate edge device can be provided outside of the target system 106. For example, a content delivery network (CDN) can use a distributed set of edge servers that then communicate with the target system 106, e.g., using designated communication paths. In such cases, a request from a particular source device may be routed to a particular edge server of the CDN. The edge server can then forward content of the request to the system.

Each edge device, e.g., edge device 108, can only accept a specified number of connections at a time. Thus, if the source computers 102a-n flood the edge device 108 with enough connection requests, a volume of requests can be reached where no further requests can be accepted. This can result in slowdown of the target system performance or render particular resources unavailable to requesters. For example, non-attacking user devices may be unable to connect to particular requested web resources or services.

Figure 2:
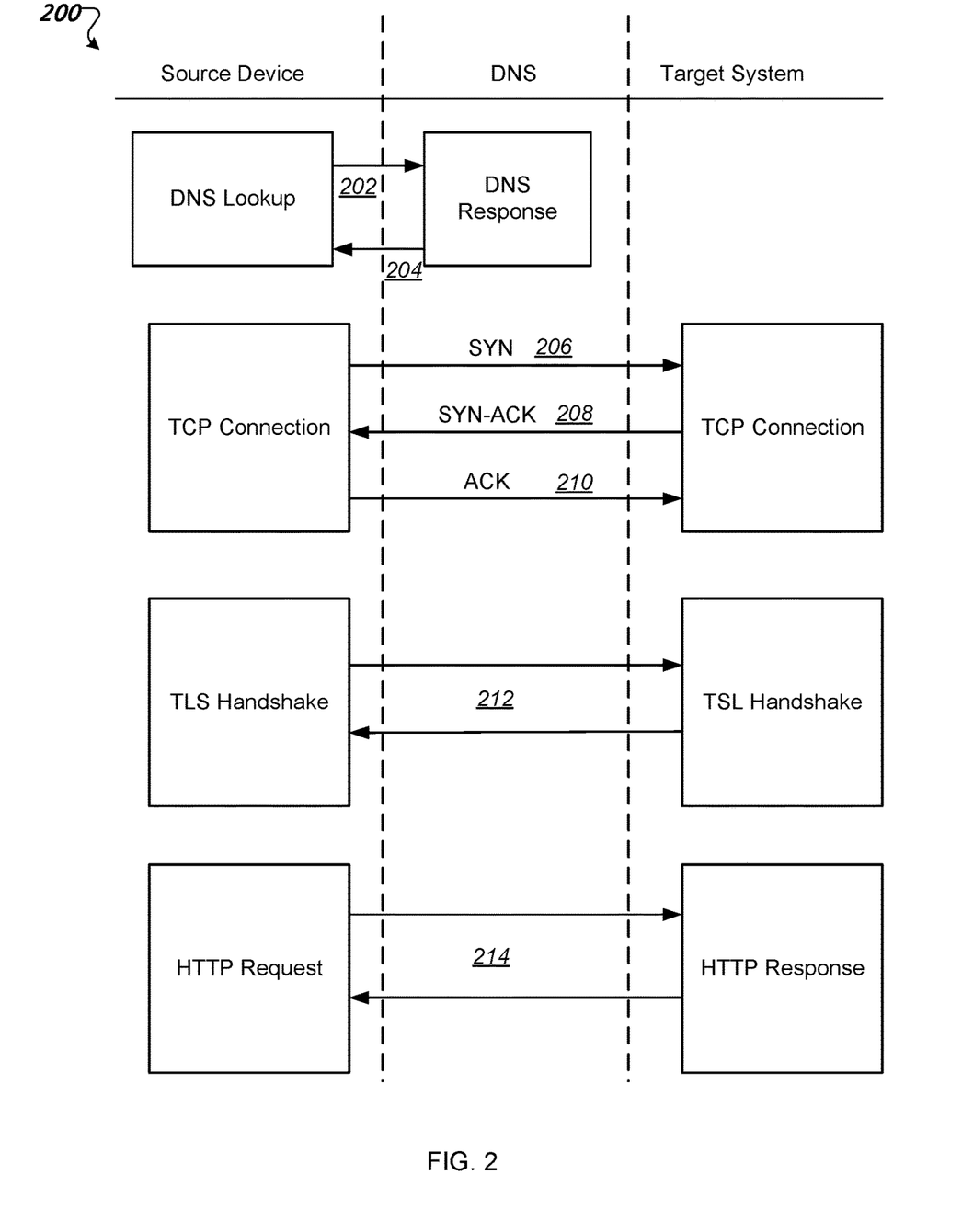
FIG. 2 is a diagram illustrating an example network connection process between a client device and a server.

Establishing a connection between a client device and a system to exchange data involves several steps. FIG. 2 is a diagram 200 illustrating an example network connection process between a client device and a system. For purposes of this example, the client device is contacting a server hosting a particular website.

The client device first resolves a domain name for the request. For example, when a user enters a particular web address, the client sends a Domain Name Server (DNS) request to a local DNS server (202). The DNS server matches the domain name provided with the request to a particular IP address. For example, a user can enter the web address "www.example.com" into their web browser. The DNS resolves the example.com domain name into a particular IP address, e.g., 172.16.254.1. The DNS server then returns the IP address to the client device (204).

The client device then establishes a Transmission Control Protocol (TCP) connection with the IP address corresponding to the entered domain. Establishing a TCP connection includes exchanging packets between the client device and the system according to a TCP specification. In particular, the TCP specification defines a three way handshake for establishing a TCP connection. First the client device sends a synchronize (SYN) packet to the system (206). The system responds with an acknowledgement by sending a SYN-ACK packet back to the client device. (208). Finally, the client devices answers with an ACK packet (208) and the TCP connection between the client device and the server is established.

For many communications, in particular with respect to communications involving services provided by the system, it is important to encrypt the communication. The Transport Layer Security (TLS) protocol is used on top of TCP to provide encryption, authentication, and integrity to communications. The encryption obfuscates what specific information is being transmitted between the client and the system. The authentication allows for verification of identity, e.g., using a certificate. Integrity is used to detect tampering with the data communication between the client and server.

To establish the encrypted communication between the client device and the system, the client device initiates a TLS handshake (212). The TLS handshake is a four part handshake that establishes the keys used to encrypt the data communication and verifies the certificate of the system.

After establishing a TCP connection that is encrypted by the TLS, the client device sends an HTTP request to the system for the particular web resource or resources (214). The system can respond to the HTTP request with a response that includes the particular requested content, for example, the content of a web page that the client device browser can load and display to a user (216).

As illustrated above with respect to HTTP cookies, the HTTP request fields can be manipulated by attackers. These fields are often accessible to the malware established on the source devices allowing the identity of the source computer to be hidden from the target system. However, information in the TCP and TLS communication packets used to establish the connection with the target system is not easily modified by an attacker and can be used to generate an identifier for the source device.

Figure 3:
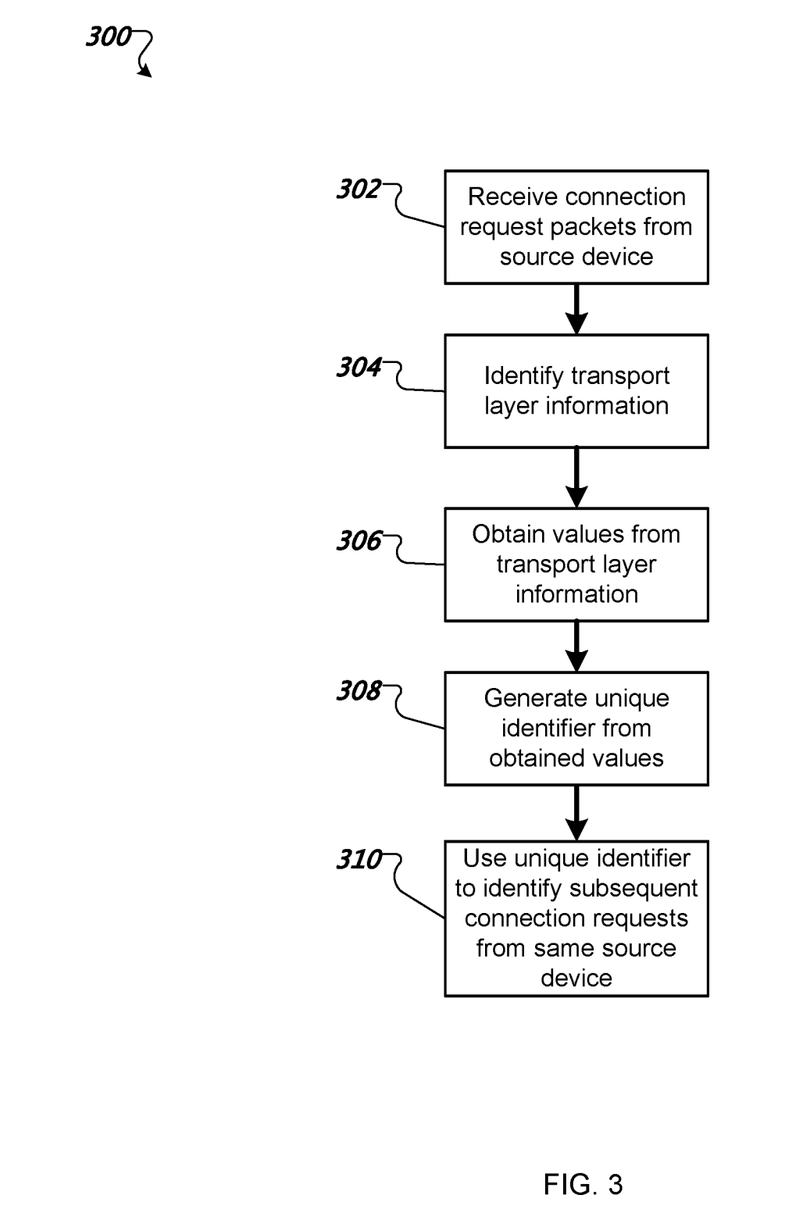
FIG. 3 is a flow diagram illustrating an example process for generating an identifier for a client device.

FIG. 3 is a flow diagram illustrating an example process 300 for identifying a client device. For conveniences, the process 300 will be described with respect to a target system that is performing the process 300.

The system receives connection request packets from a source device (302). The received packets can include TCP connection packets and TLS handshake packets for establishing a connection between the source device and the system.

The system identifies particular parameters from the transport layer packets (304). The parameters include two or more parameters identified as providing information that can be used to uniquely identify the source device. In particular, there are a number of parameters that are not specified by the TCP specification. Instead, the initial values of those parameters are left open to the operating system of the individual client device to set. The particular values set by a given operating system differ between different operating systems and different versions of each operating system. This increases a likelihood that the parameter values from two different requests are different.

These parameters occur in the transport layer packets and therefore are usually only visible to the edge devices of the system. A kernel module can be generated that exposes these values to an application program interface (API) so that they can be accessed in user space. In some implementations, a custom TCP stack can be implemented that provides access to the TCP parameters.

In some implementations, the edge devices are located remotely from the system, for example, as part of a CDN. The values of the identified parameters can be obtained from the corresponding edge servers of the CDN. For example, each edge server of the CDN can forward parameters/value pairs to the system for received connection requests.

A TCP packet includes a number of fields representing particular parameters that can have different types of values. Some parameter values are defined by the TCP specification and depend upon the particular communication, e.g., a destination field identifying a destination IP address. However, some other parameters have default values specified by the individual source device OS. Examples of these parameters include a receive window size parameter, a maximum segment size parameter, a window scaling parameter, a fragmentation flag parameter, and a selective acknowledgements ok flag parameter.

The receive window size parameter represents an amount of data that the client device can receive without sending a return acknowledgment. The maximum segment size parameter indicates a value corresponding to a largest amount of data that the client device is willing to receive in a single segment. The window scaling parameter represents allows the value of the maximum window size to be increased. The selective acknowledgements ok flag parameter allows the receiver to acknowledge discontinuous blocks of packets that were received correctly. The foregoing parameters only represent some of the TCP parameter values that can be used to uniquely identify a source device. In some implementations, other TCP parameters can be used instead of, or in addition to, the identified parameters. For example, TCP provides for a number of extensions that could potentially be used as parameters.

The TLS handshake packets also include fields for parameters that have values set by the source device OS rather than being determined by the communication itself. These include a client version, a cipher suite list and order, compression methods list and order, extensions list and order, signature algorithms list and order, elliptic curve list and order, and elliptic curve point format.

The client version indicates which version of the TLS protocol the client is using. The cipher suite list and order indicates a list of supported SSL ciphers that the recipient can select from. Different client devices support a different set of ciphers. The compression methods indicate compression methods available to the client device for communications. TLS provides for a number of extensions including, for example, extensions specifying a maximum fragment length, extensions associated with client certificates, extensions identifying which certification authority root keys are possessed by the client device, and extensions for using truncated message authentication codes. The signature algorithms list is an extension used to indicate to the recipient which signature/hash algorithm pairs may be used in digital signatures. The elliptic curve list identifies elliptic curve cryptography ciphers available for use by the client. The elliptic curves points format is a TLS extension identifying particular point formats, e.g., compressed or uncompressed.

The system obtains the values from the transport layer packets for two or more of the parameters (306). The system generates a unique identifier for the client device using the extracted values (308). In some implementations, the system concatenates the extracted values in a particular parameter order to generate a string of values. The string can then be input to a cryptographic hash function to generate a particular cryptographic hash value. This cryptographic hash value can be used as a unique identifier for the source device. The particular selected parameters and number of parameters used can reduce a likelihood of hash collisions. Alternatively, the string of parameter values can be used as the identifier without hashing or by applying another function to the string. Regardless of the technique, the string of parameters is ordered the same each time so that the same identifier can be generated for subsequent requests of a particular source device.

In some implementations, the IP address of the source device is used in combination with the parameter values to generate the identifiers for the source device. The IP address can be added to the string of values input to the cryptographic hash function. This increases the entropy of the generated identifier. In many cases, using the IP address as part of the identifier is short lived. This can allow for monitoring requests from particular users over a finite time period, which can aid in identifying abnormal levels of requests from the source device.

However, when using the IP address, an attacking device can be seen as new if the user of that device changes networks. For example, a laptop computer that was infected with code by an attacker to use the laptop computer in an attack may change IP addresses as the legitimate owner changes locations with the laptop computer. The changed IP address would mean that a new identifier is generated indicating a new source device. However, network changes can take time that reduces the ability of an attacker to generate the load on the system. Thus, while an attacker can change networks to subvert the identifier, this can also impact their ability to support the attack.

The system uses the unique identifier to identify subsequent connection requests from the same source device (310). In particular, the unique identifier is generated for each incoming connection request. A generated hash value for a connection request can be compared to previously generated identifiers to determine if the request is from a new device or a known device. When a subsequent connection request has an identifier that matches an existing identifier, a count can be incremented indicating a number of connection requests received from that source device. Subsequent connection requests from a same source device can also be associated with time information so that the rate of connection requests over a specified time period can be calculated. This information can be used to calculate whether or not the rate of connection requests are suspicious or to calculate a confidence value indicating a risk level associated with the source device.

In some implementations, each connection from a source device is added to a Markov chain. The Markov chain can be used to maintain a state for each source device, for example, indicating whether source device behavior corresponds to a legitimate state or an attack state.

Figure 4:
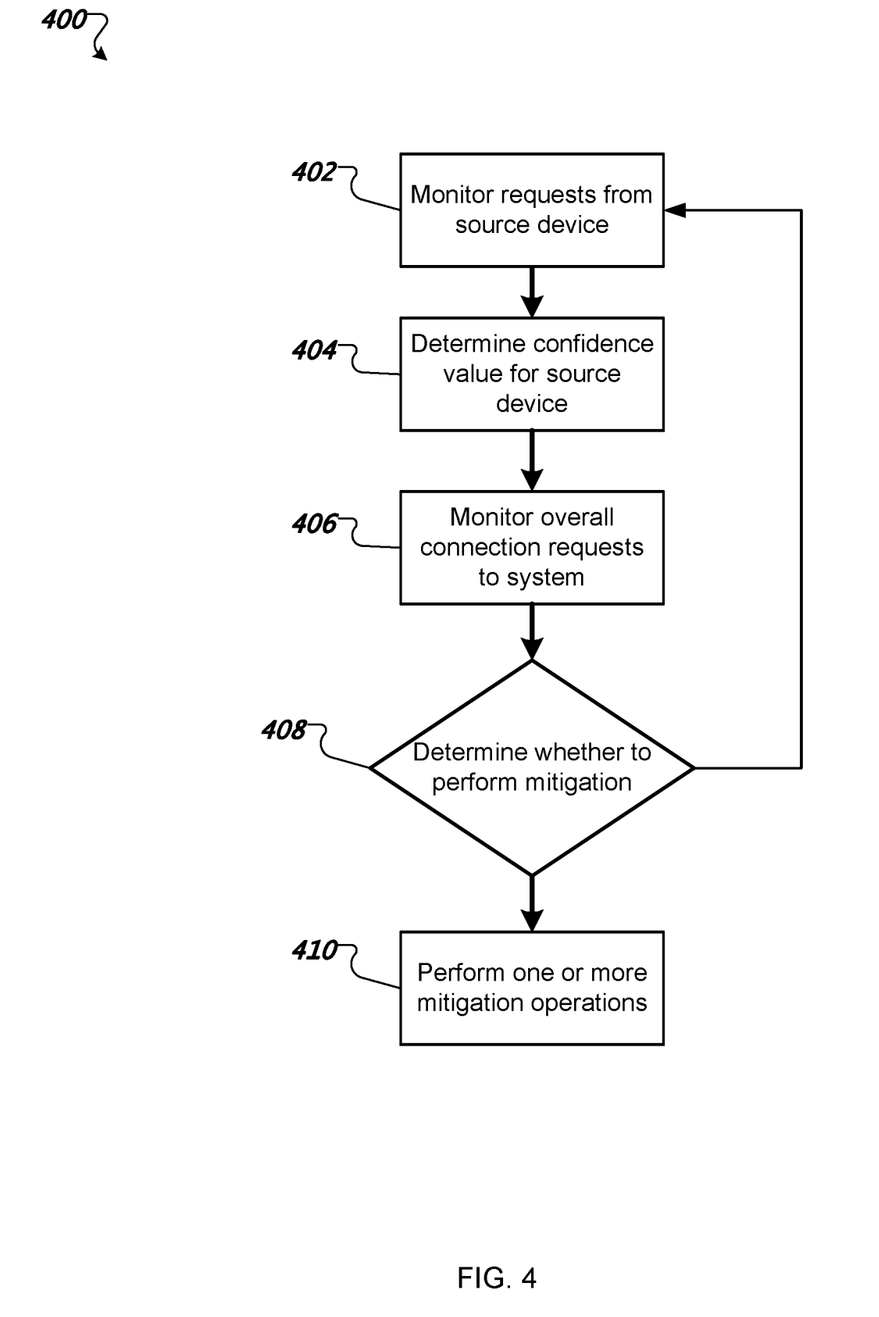
FIG. 4 is a flow diagram illustrating an example process for DDoS mitigation.

FIG. 4 is a flow diagram of an example process for using source device identifiers to mitigate DDoS attacks. For convenience, the process 400 will be described with respect to a system performing the process 400.

The system monitors requests received from a particular source device (402). For example, the source device can have an associated identifier generated as described above with respect to FIG. 3. The monitoring can include storing a frequency of connections from the source device over a specified period of time. In some implementations, a Markov chain is used to store each occurrence of a request from the source device.

The system determines a confidence value for the source device (404). The confidence value reflects a system confidence that the source device is legitimate. In some implementations, the confidence is based on one or more rules. For example, particular rules can indicate a particular number of requests within a particular time frame are more indicative of an attack versus legitimate requests.

A type of request can also provide an indication of whether the requests are legitimate. For example, a rule can indicate that multiple requests in a given time period for the same network resource suggests a less legitimate user than requests for different network resources.

Each rule can be used to generate a score for source device for that rule. Each rule can also have an assigned weight that can be applied to the score. For example, some rules may be considered a greater indicator of confidence than other rules. The scores for each rule can be combined. The combined score can be used to assign the confidence value for the source device.

In some implementations, confidence can also be based on an age of an identifier. In particular, an older identifier may have more confidence of being from a legitimate user than a newer identifier.

In some other implementations, the confidence is based off of the Markov chain. In particular, the Markov chain can predict the confidence level of the source device based on state transitions. In particular, a source device considered to have high confidence of being legitimate may take more abnormal behavior to transition to a state where there is a high confidence of being illegitimate.

The system monitors overall requests to the system (406). The overall requests to the system do not differentiate between legitimate user devices and attacking user devices. In particular, the system can compare the overall number of connections requests received with one or more criteria. The criteria can include a number of connection requests relative to a total number of connections that can be received at a given time. For example, an initial criteria can represent a first level of overall capacity, e.g., 80%, and a second criteria can represent a second level of overall capacity, e.g., 90%. The criteria can also include an historical baseline of requests that may indicate if a current number of connection requests is unusual.

The system determines whether to perform a mitigation operation (408). The determination can be based on the comparison of the number of requests to the system as compared to the criteria. For example, if the criterion for 80% of the capacity for receiving new connection requests is satisfied, the system can determine to perform a mitigation operation.

In another example, the mitigation decision can be based on the confidence level of one or more source devices. For example, if a confidence that the source device is 5% or less, the system can determine to perform a mitigation operation. If it is determined not to perform a mitigation operation, the system returns to monitoring connection requests, both from individual source devices and overall requests.

The system performs one or more mitigation operations (410). The mitigation operations can be performed across a number of source devices or specifically targeting a single source device. For example, the system can apply rate limiting. Rate limiting controls the rate of traffic sent or received. For example, the requests received can be limited so that it is more difficult for attackers to generate an amount of load on the backend of the system. In some implementations, individual source devices can be targeted based, e.g., on their confidence level. For example, a source device with a very low confidence, e.g., 5% or less, can be targeted. The targeting can include accepting a particular connection request from the source device, but delaying the response. This causes the source device to wait, which limits the source device ability to send multiple connection requests in a short period of time.

The mitigation can also include load shedding. For example, when the overall connections satisfy the criterion for 80% of the capacity for receiving new requests, the system can disconnect from source devices below a specified confidence level, e.g., 5%. This can be scaled up if the load continues to increase. For example, if the overall connections satisfy the criterion for 90% of the capacity for receiving new requests, the system can disconnect from source devices below a higher confidence level, e.g., 10%.

In some implementations, the unique identifier can be used to detect other anomalous activities by particular source devices. For example, being able to identify source devices associated with particular activities using the unique identifier can aid in identifying fraudulent behavior. For example, repeated behavior of an identified source device indicating possible fraudulent behavior can include: Trying different credit cards, potentially with different names or countries where they were issued, or having a package shipped to a location that doesn't match with the credit card location or billing address. Thus, repeat behavior that may be suspect can be identified using the passive identifiers that might otherwise be more difficult to track.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface, a web browser, or an app through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    receiving one or more data packets at a network location from a client device, the one or more data packets being associated with a connection request from the client device seeking a connection with particular network resources;
    identifying transport layer information from the one or more data packets;
    extracting particular values of two or more first parameters from the transport layer information, wherein the two or more first parameters include at least two parameters whose values are specified by an operating system of the client device;
    generating a cryptographic hash value from the extracted values, wherein the hash value provides an identifier for the client device;
    using the identifier for the client device to monitor a behavior of the client device, comprising identifying one or more subsequent connection requests received from the client device and determining a rate of connection requests received from the client device over time;
    generating, using a plurality of second parameters representing the behavior of the client device, a confidence value that is a single value that represents a likelihood that the client device is a legitimate client device, wherein the plurality of second parameters comprises the determined rate of connection requests, and wherein generating the confidence value comprises:
        generating, for each of the plurality of second parameters representing the behavior of the client device, a respective initial score;
        generating a combined score by computing a weighted sum of the initial scores, wherein each initial score is weighted by a predetermined weight value assigned to the corresponding second parameter; and
        determining the confidence value according to the combined score; and
    determining, using the confidence value, whether to perform denial of service (DoS) mitigation with respect to the client device.

2. The method of claim 1, wherein identifying one or more subsequent connection requests from the client device comprises:
    receiving one or more data packets at the network location associated with a new connection request;
    extracting particular values from transport layer information;
    generating a new hash value from the extracted values; and
    determining that the new hash value corresponds to the same client device based on a comparison between the new hash value and the hash value.

3. The method of claim 1, wherein determining whether to perform DoS mitigation with respect to the client device comprises:
    determining a total number of connection requests to the network resources being received;
    determining a current load of the network resources, comprising comparing the total number of connection requests with an overall capacity of the network resources; and determining whether to perform DoS mitigation with respect to the client device using i) the confidence value and ii) the current load of the network resources.

4. The method of claim 3, wherein determining whether to perform DoS mitigation with respect to the client device using i) the confidence value and ii) the current load of the network resources comprises:
   determining that the current load of the network resources satisfies a first threshold load and, in response:
      determining whether the confidence value satisfies a first threshold confidence value; and
      in response to determining that the confidence value satisfies the first threshold confidence value, initiating one or more DoS mitigation controls.

5. The method of claim 4, wherein determining whether to perform DoS mitigation with respect to the client device using i) the confidence value and ii) the current load of the network resources further comprises:
   determining that the current load of the network resources satisfies a second threshold load, wherein the second threshold load represents a higher proportion of the overall capacity of the network resources than the first threshold load and, in response:
      determining whether the confidence value satisfies a second threshold confidence value, wherein the second threshold confidence value represents a higher likelihood that the client device is a legitimate client device than the first threshold confidence value; and
      in response to determining that the confidence values satisfies the second threshold confidence value, initiating one or more DoS mitigation controls.

6. The method of claim 1, wherein performing DoS mitigation comprises one or more of initiating rate limiting or initiating load shedding with respect to the client device.

7. The method of claim 1, wherein generating the hash value comprises concatenating the extracted values to form a single string and generating the hash value from the string.

8. The method of claim 1, wherein the at least two parameters whose values are specified by the client device operating system include one or more transport control protocol (TCP) parameters having values specified by an operating system of the client device, the one or more TCP parameters including one or more of a receive window size parameter, a maximum segment size parameter, a window scaling parameter, a fragmentation flag parameter, or a selective acknowledgements ok flag parameter.

9. The method of claim 1, wherein the at least two parameters whose values are specified by the client device operating system include one or more transport layer security (TLS) parameters having values specified by an operating system of the client device, the one or more TLS parameters including one or more of a client version, a cipher suite list and order, a compression methods list and order, an extensions list and order, a signature algorithms list and order, an elliptic curve list and order, or an elliptic curve point format.

10. The method of claim 1, wherein the at least two parameters whose values are specified by the client device operating system include two of a receive window size parameter, a maximum segment size parameter, a window scaling parameter, a fragmentation flag parameter, a selective acknowledgements ok flag parameter, a client version, a cipher suite list and order, a compression methods list and order, an extensions list and order, a signature algorithms list and order, an elliptic curve list and order, or an elliptic curve point format.

11. The method of claim 1, wherein generating the confidence value comprises generating the confidence value according to an age of the identifier for the client device, wherein a higher age of the identifier corresponds to a higher likelihood that the client device is a legitimate client device.

12. A system comprising:
   one or more computers and one or more storage devices on which are stored instructions that are operable, when executed by the one or more computers, to cause the one or more computers to perform operations comprising:
   receiving one or more data packets at a network location from a client device, the one or more data packets being associated with a connection request from the client device seeking a connection with particular network resources;
   identifying transport layer information from the one or more data packets;
   extracting particular values of two or more first parameters from the transport layer information, wherein the two or more first parameters include at least two parameters whose values are specified by an operating system of the client device;
   generating a cryptographic hash value from the extracted values, wherein the hash value provides an identifier for the client device;
   using the identifier for the client device to monitor a behavior of the client device, comprising identifying one or more subsequent connection requests received from the client device and determining a rate of connection requests received from the client device over time;
   generating, using a plurality of second parameters representing the behavior of the client device, a confidence value that is a single value that represents a likelihood that the client device is a legitimate client device, wherein the plurality of second parameters comprises the determined rate of connection requests, and wherein generating the confidence value comprises:
      generating, for each of the plurality of second parameters representing the behavior of the client device, a respective initial score;
      generating a combined score by computing a weighted sum of the initial scores, wherein each initial score is weighted by a predetermined weight value assigned to the corresponding second parameter; and
      determining the confidence value according to the combined score; and
   determining, using the confidence value, whether to perform denial of service (DoS) mitigation with respect to the client device.

13. The system of claim 12, wherein identifying one or more subsequent connection requests from the client device comprises:
   receiving one or more data packets at the network location associated with a new connection request;
   extracting particular values from transport layer information;
   generating a new hash value from the extracted values; and
   determining that the new hash value corresponds to the same client device based on a comparison between the new hash value and the hash value.

14. The system of claim 12, wherein determining whether to perform DoS mitigation with respect to the client device comprises:

determining a total number of connection requests to the network resources being received;

determining a current load of the network resources, comprising comparing the total number of connection requests with an overall capacity of the network resources; and determining whether to perform DoS mitigation with respect to the client device using i) the confidence value and ii) the current load of the network resources.

15. The system of claim 12, wherein performing DoS mitigation comprises one or more of initiating rate limiting or initiating load shedding with respect to the client device.

16. The system of claim 12, wherein generating the hash value comprises concatenating the extracted values to form a single string and generating the hash value from the string.

17. The system of claim 12, wherein the at least two parameters whose values are specified by the client device operating system include one or more transport control protocol (TCP) parameters having values specified by an operating system of the client device, the one or more TCP parameters including one or more of a receive window size parameter, a maximum segment size parameter, a window scaling parameter, a fragmentation flag parameter, or a selective acknowledgements ok flag parameter.

18. The system of claim 12, wherein the at least two parameters whose values are specified by the client device operating system include one or more transport layer security (TLS) parameters having values specified by an operating system of the client device, the one or more TLS parameters including one or more of a client version, a cipher suite list and order, a compression methods list and order, an extensions list and order, a signature algorithms list and order, an elliptic curve list and order, or an elliptic curve point format.

19. One or more computer-readable storage media encoded with instructions that, when executed by one or more computers, cause the one or more computers to perform operations comprising:

receiving one or more data packets at a network location from a client device, the one or more data packets being associated with a connection request from the client device seeking a connection with particular network resources;

identifying transport layer information from the one or more data packets;

extracting particular values of two or more first parameters from the transport layer information, wherein the two or more first parameters include at least two parameters whose values are specified by an operating system of the client device;

generating a cryptographic hash value from the extracted values, wherein the hash value provides an identifier for the client device;

using the identifier for the client device to monitor a behavior of the client device, comprising identifying one or more subsequent connection requests received from the client device and determining a rate of connection requests received from the client device over time;

generating, using a plurality of second parameters representing the behavior of the client device, a confidence value that is a single value that represents a likelihood that the client device is a legitimate client device, wherein the plurality of second parameters comprises the determined rate of connection requests, and wherein generating the confidence value comprises:

generating, for each of the plurality of second parameters representing the behavior of the client device, a respective initial score;

generating a combined score by computing a weighted sum of the initial scores, wherein each initial score is weighted by a predetermined weight value assigned to the corresponding second parameter; and determining the confidence value according to the combined score; and determining, using the confidence value, whether to perform denial of service (DoS) mitigation with respect to the client device.

20. The one or more computer-readable storage media of claim 19, wherein identifying one or more subsequent connection requests from the client device comprises:

receiving one or more data packets at the network location associated with a new connection request;

extracting particular values from transport layer information;

generating a new hash value from the extracted values; and determining that the new hash value corresponds to the same client device based on a comparison between the new hash value and the hash value.

21. The one or more computer-readable storage media of claim 19, wherein determining whether to perform DoS mitigation with respect to the client device comprises:

determining a total number of connection requests to the network resources being received;

determining a current load of the network resources, comprising comparing the total number of connection requests with an overall capacity of the network resources; and determining whether to perform DoS mitigation with respect to the client device using i) the confidence value and ii) the current load of the network resources.

22. The one or more computer-readable storage media of claim 19, wherein performing DoS mitigation comprises one or more of initiating rate limiting or initiating load shedding with respect to the client device.

23. The one or more computer-readable storage media of claim 19, wherein generating the hash value comprises concatenating the extracted values to form a single string and generating the hash value from the string.

* * * * *